United States Patent

Griner et al.

[15] 3,675,792
[45] July 11, 1972

[54] CRACKER STACKING AND SEGREGATING APPARATUS

[72] Inventors: Arthur J. Griner, Wyckoff; George Ryder, West Orange, both of N.J.

[73] Assignee: National Biscuit Company

[22] Filed: Dec. 11, 1970

[21] Appl. No.: 97,151

[52] U.S. Cl..............................................214/6 BA, 214/7
[51] Int. Cl........................................................B65g 57/30
[58] Field of Search......................214/6 BA, 7, 6 M, 6 N, 6 F; 198/106

[56] References Cited

UNITED STATES PATENTS

| | | | |
|---|---|---|---|
| 2,345,310 | 3/1944 | Willoughby | 214/7 |
| 2,067,525 | 1/1937 | Flaherty | 214/7 X |
| 3,246,773 | 4/1966 | Hodgkins | 214/6 BA |
| 2,954,881 | 10/1960 | Hopton et al. | 214/7 X |
| 2,936,557 | 5/1960 | Fay | 214/7 X |
| 3,448,846 | 6/1969 | Bardenhagen | 214/6 NX |
| 3,570,686 | 3/1971 | Moll | 214/7 |
| 2,917,884 | 12/1959 | Winkler et al. | 214/7 UX |
| 2,564,079 | 8/1951 | Rapp | 214/7 |

FOREIGN PATENTS OR APPLICATIONS

| | | | |
|---|---|---|---|
| 69,806 | 9/1958 | France | 214/7 |

*Primary Examiner*—Robert J. Spar
*Attorney*—I. Allen Strombeck

[57] ABSTRACT

An apparatus to which plural rows of crackers are delivered for counting and stacking operations. The crackers are fed on carriers interposed to form a single line of stacks. A combination of propelling means accelerates and meters the stacks gradually towards a packaging machine thus compensating for the time lost in counting and stack forming operations.

13 Claims, 23 Drawing Figures

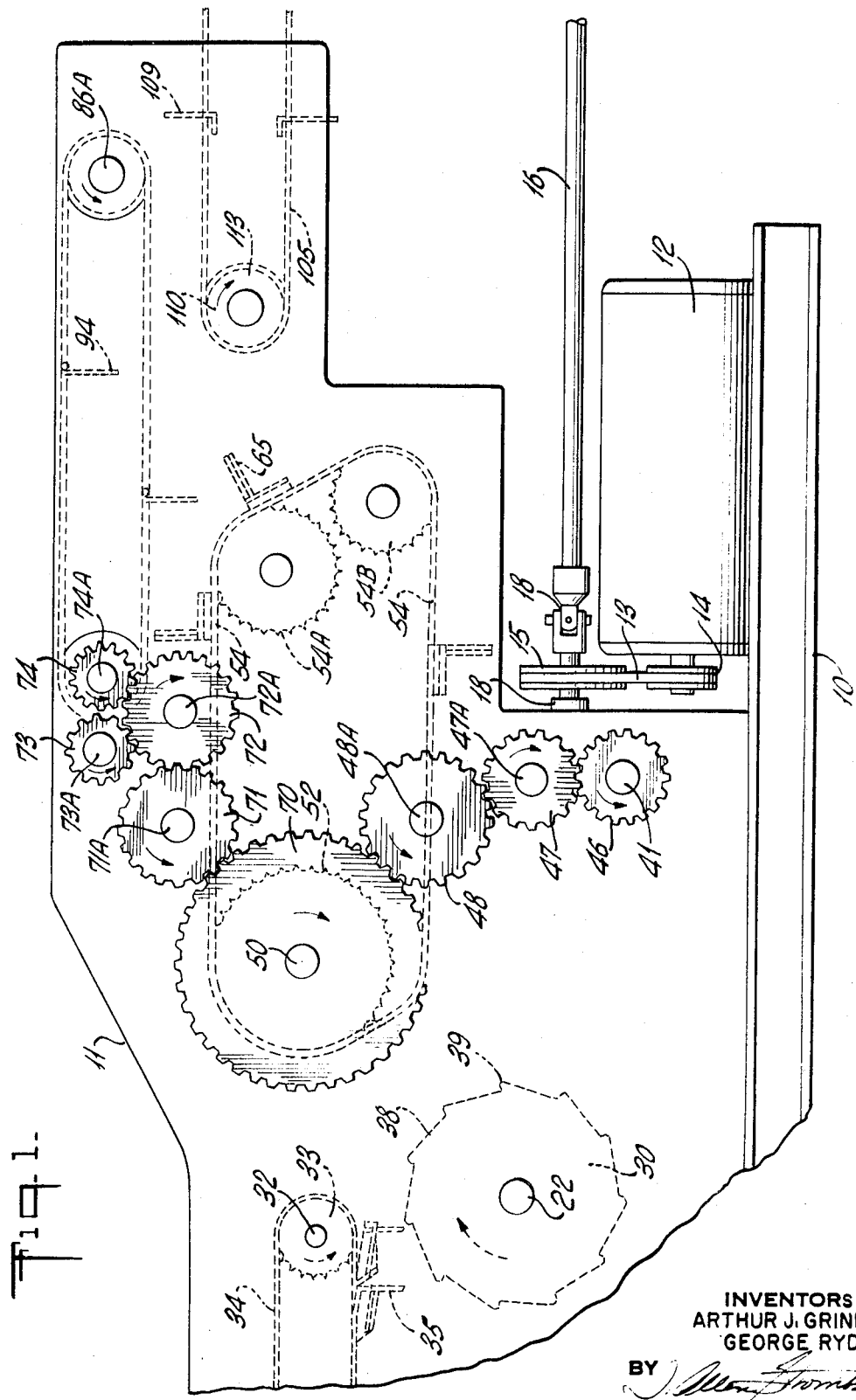

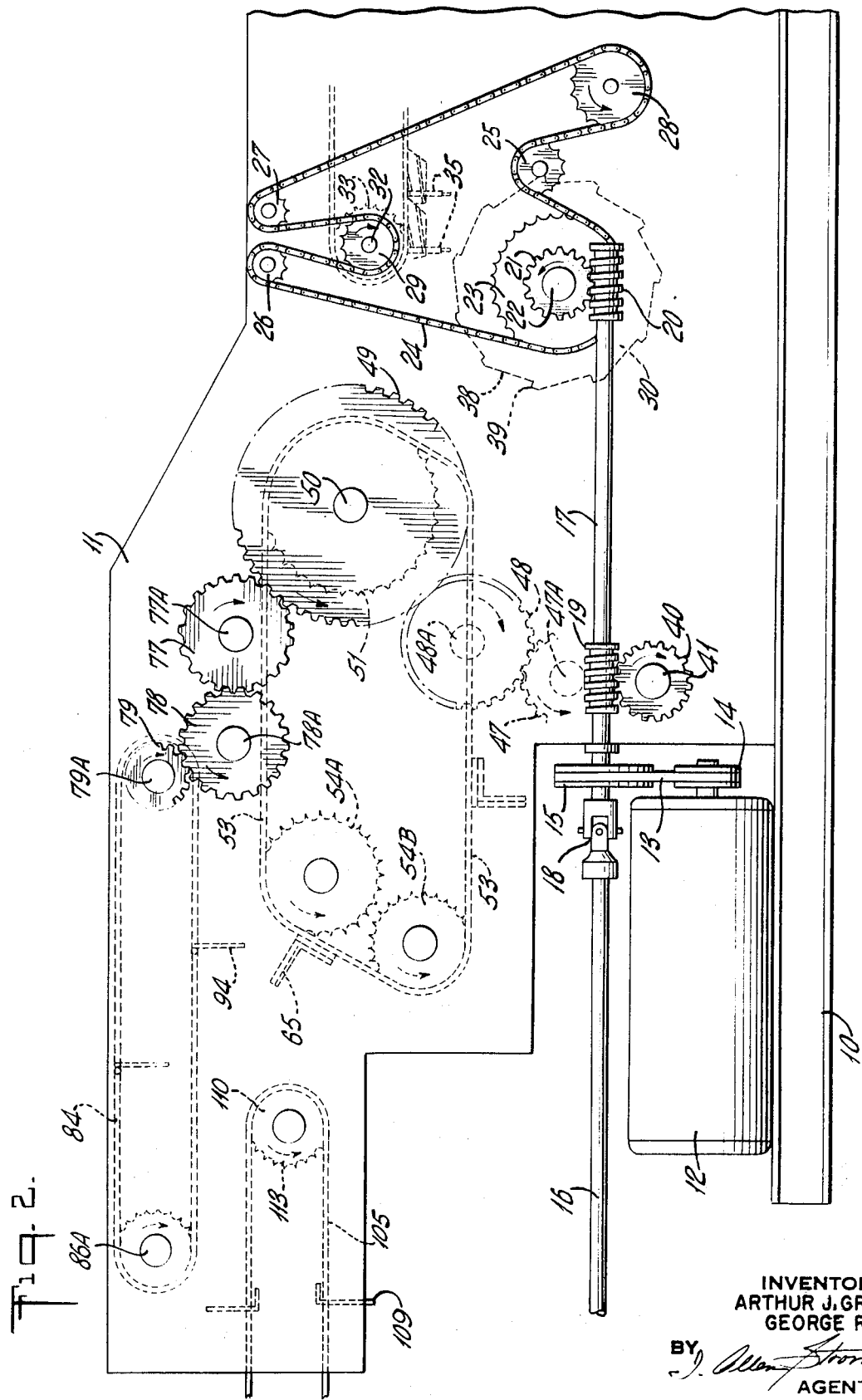

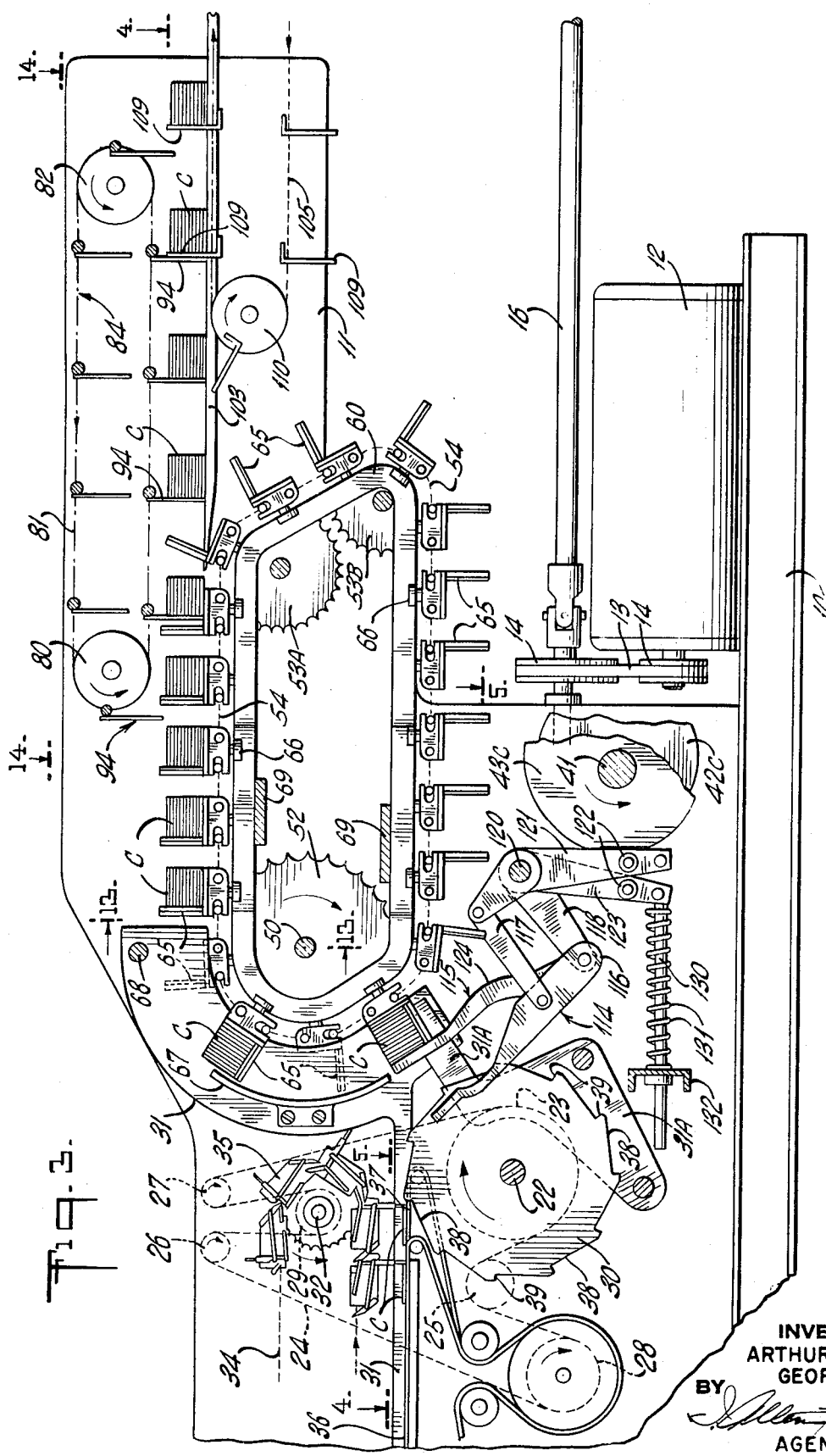

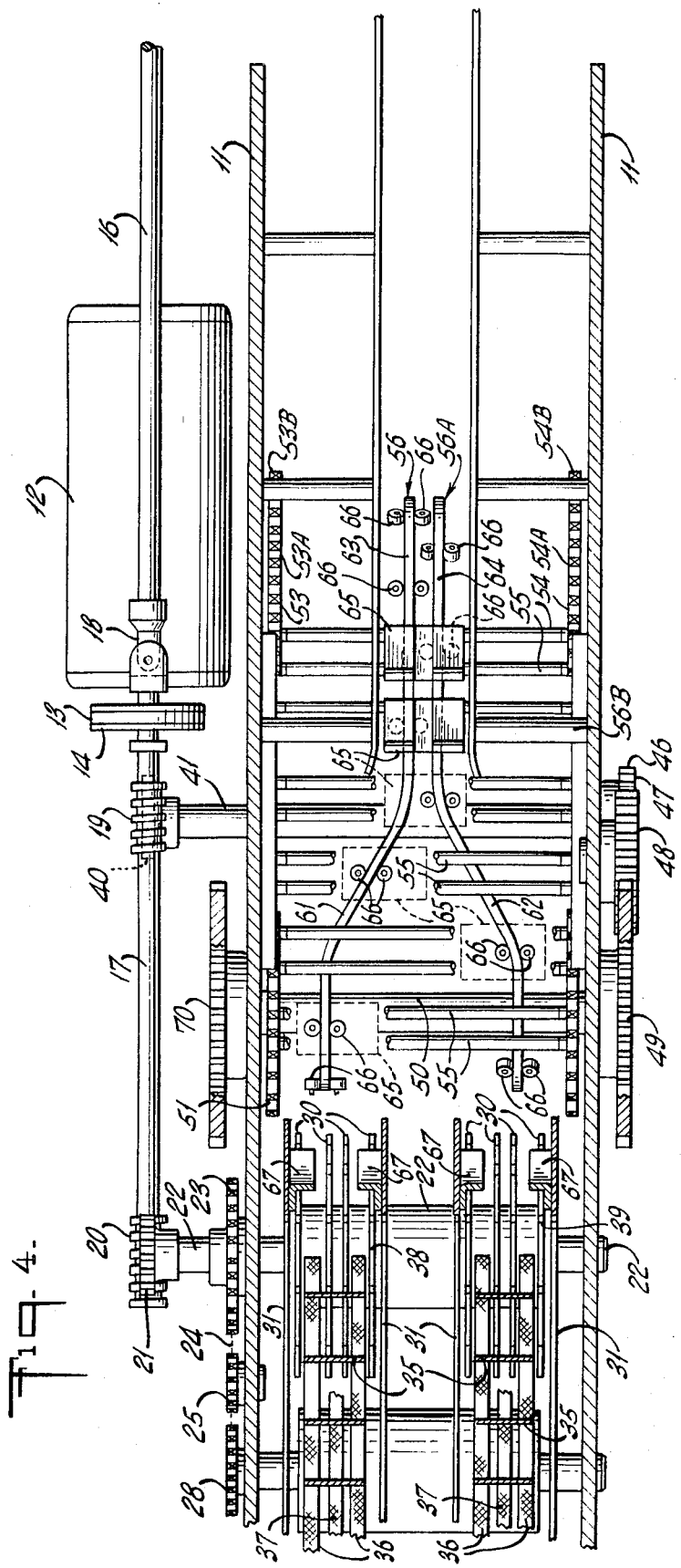

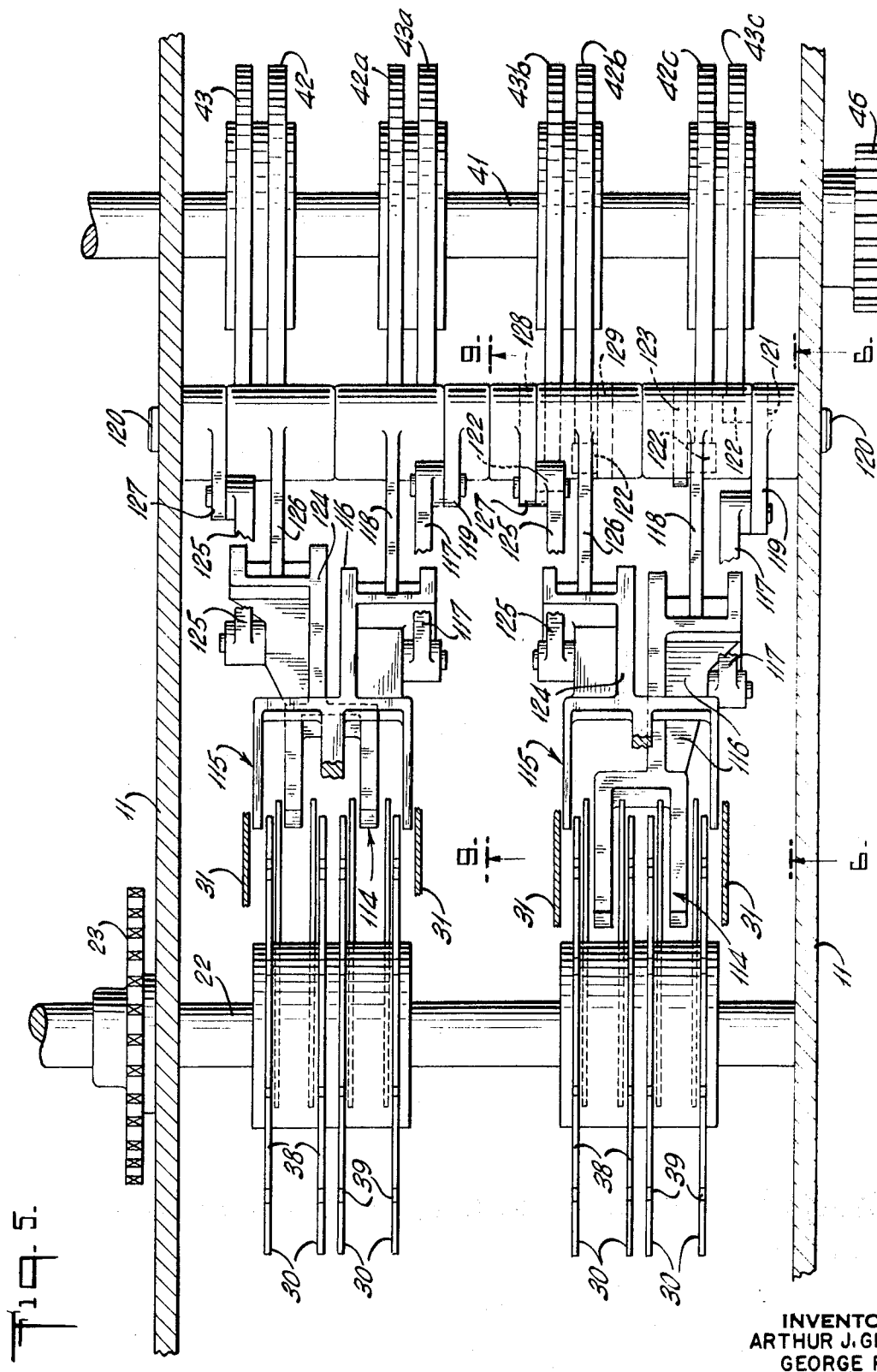

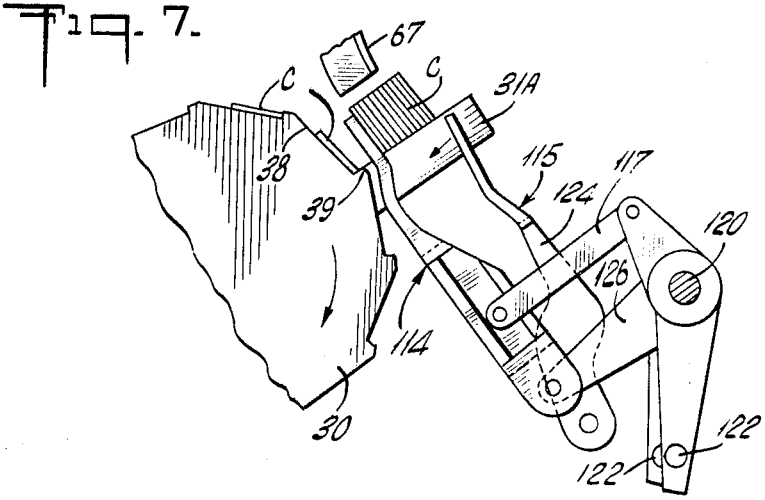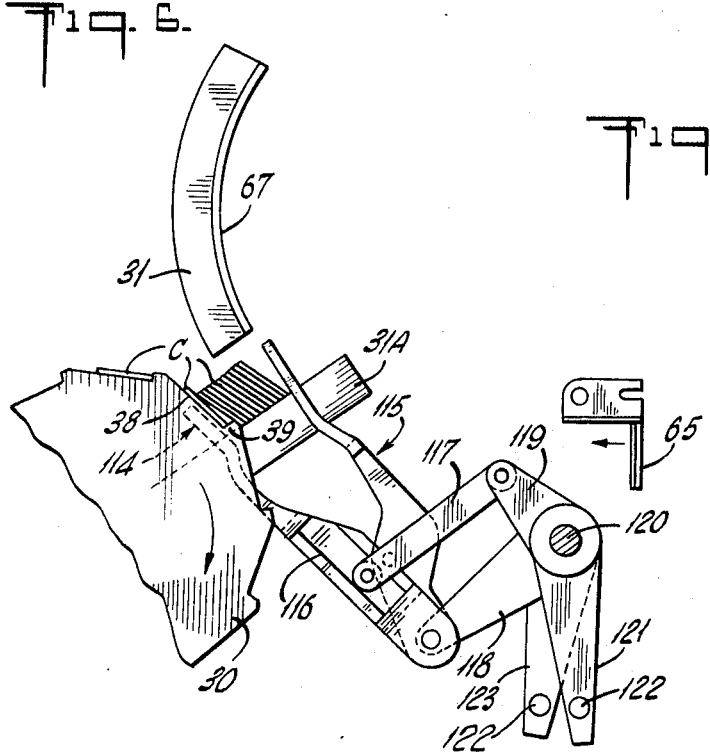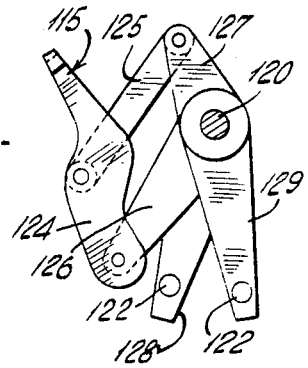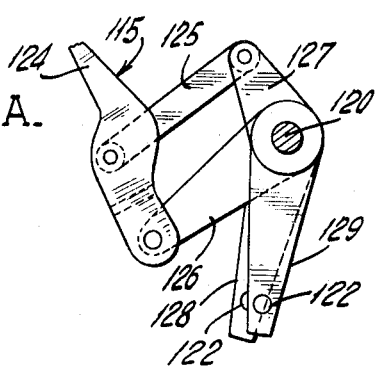

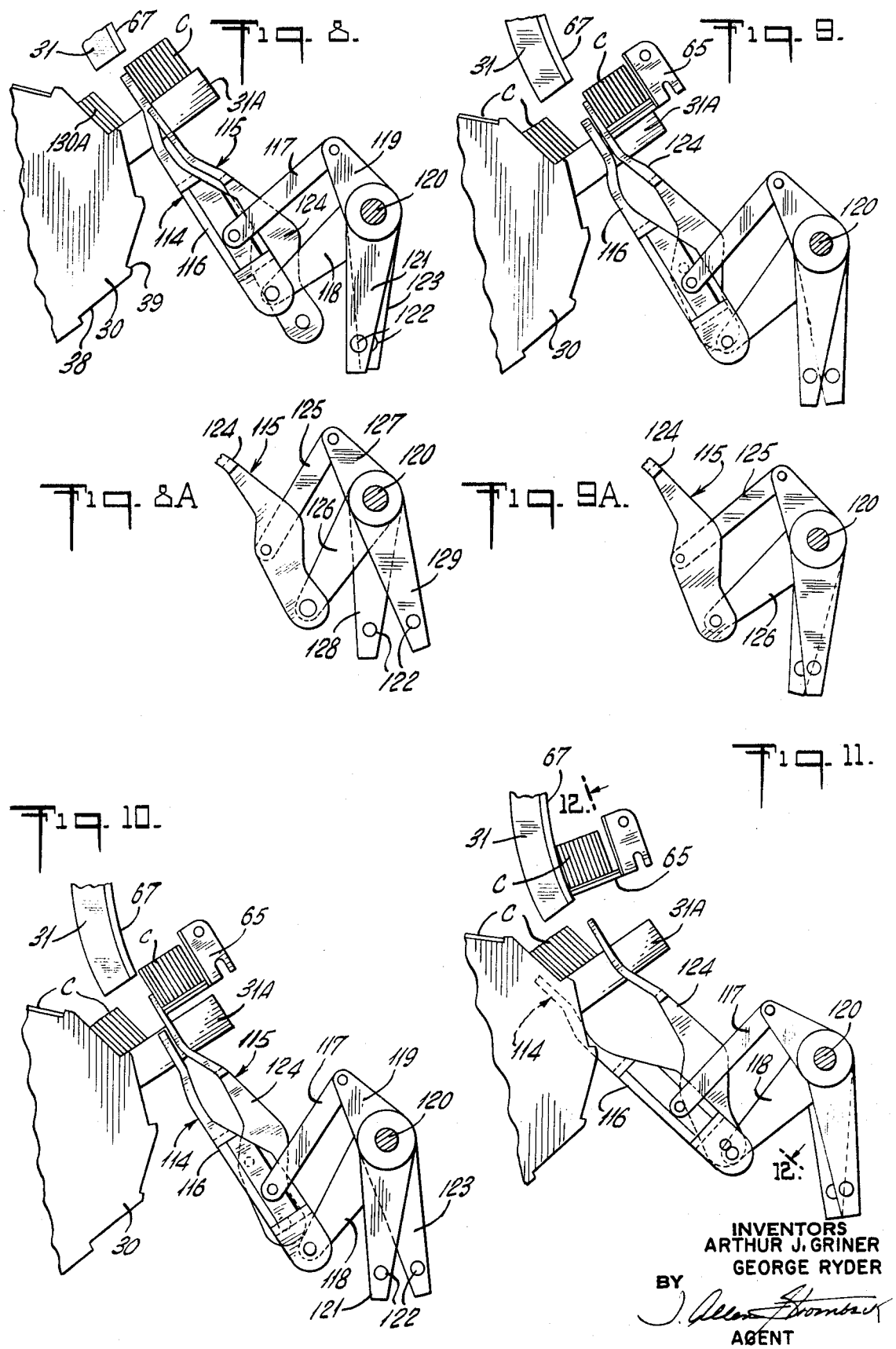

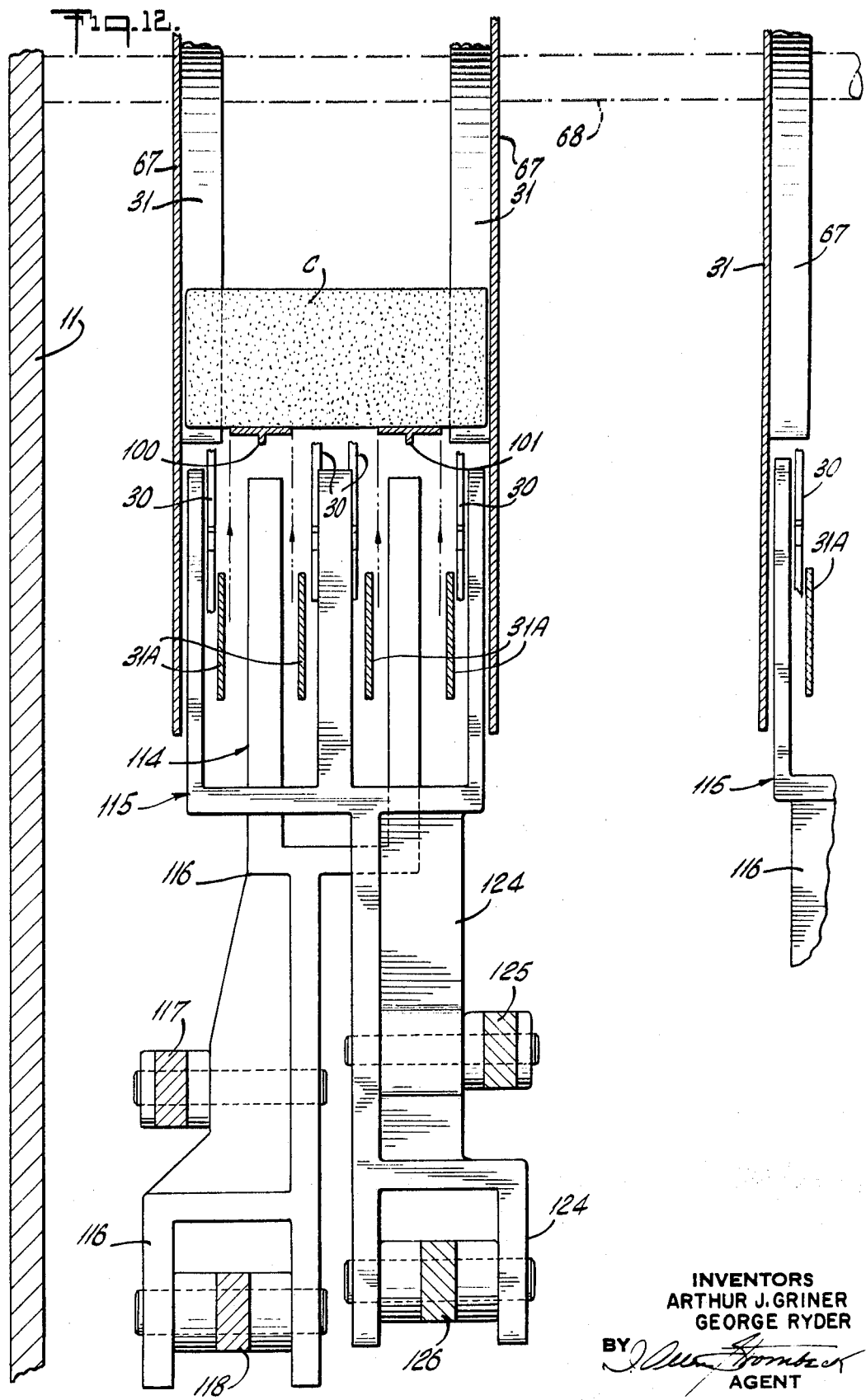

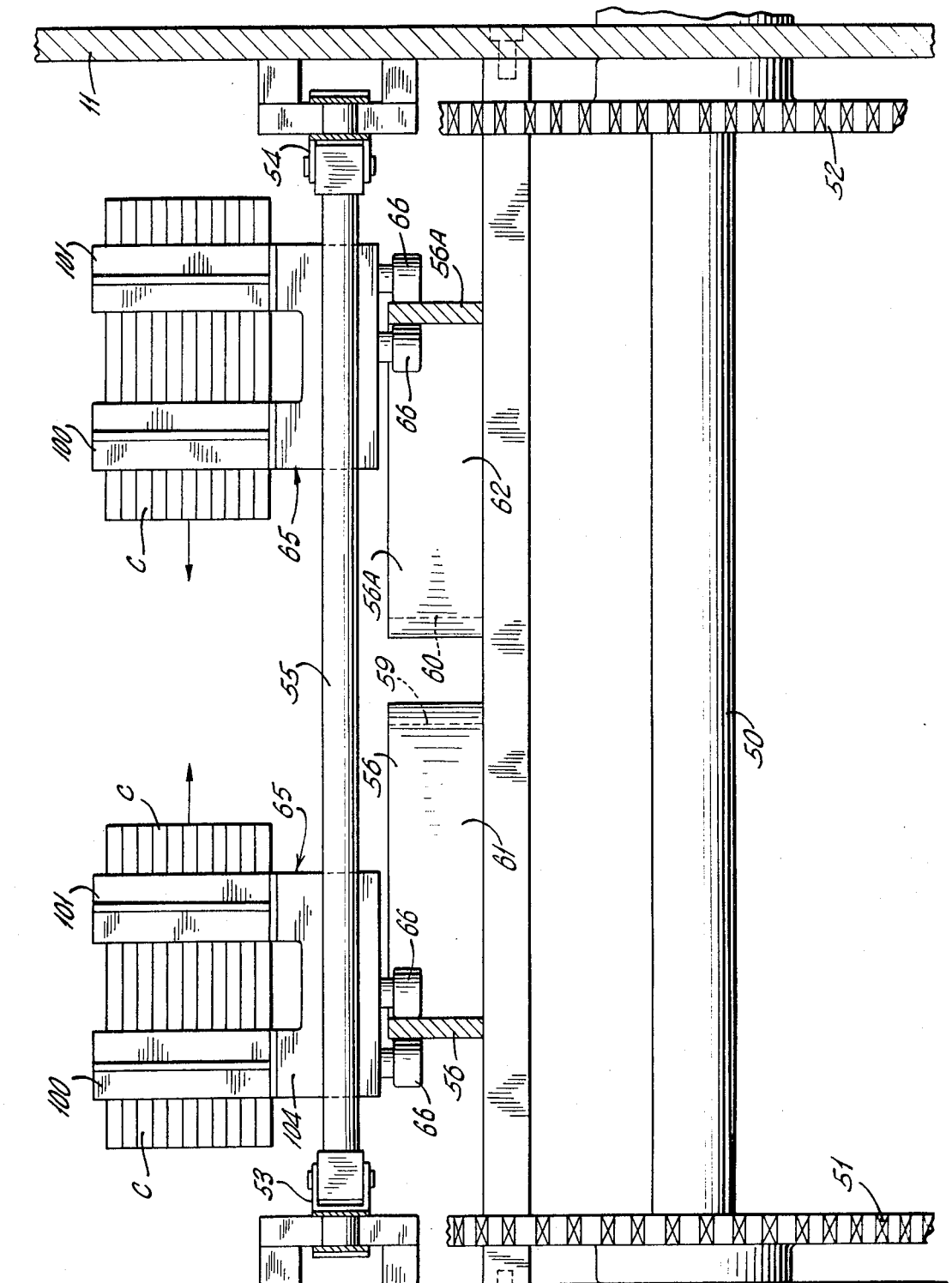

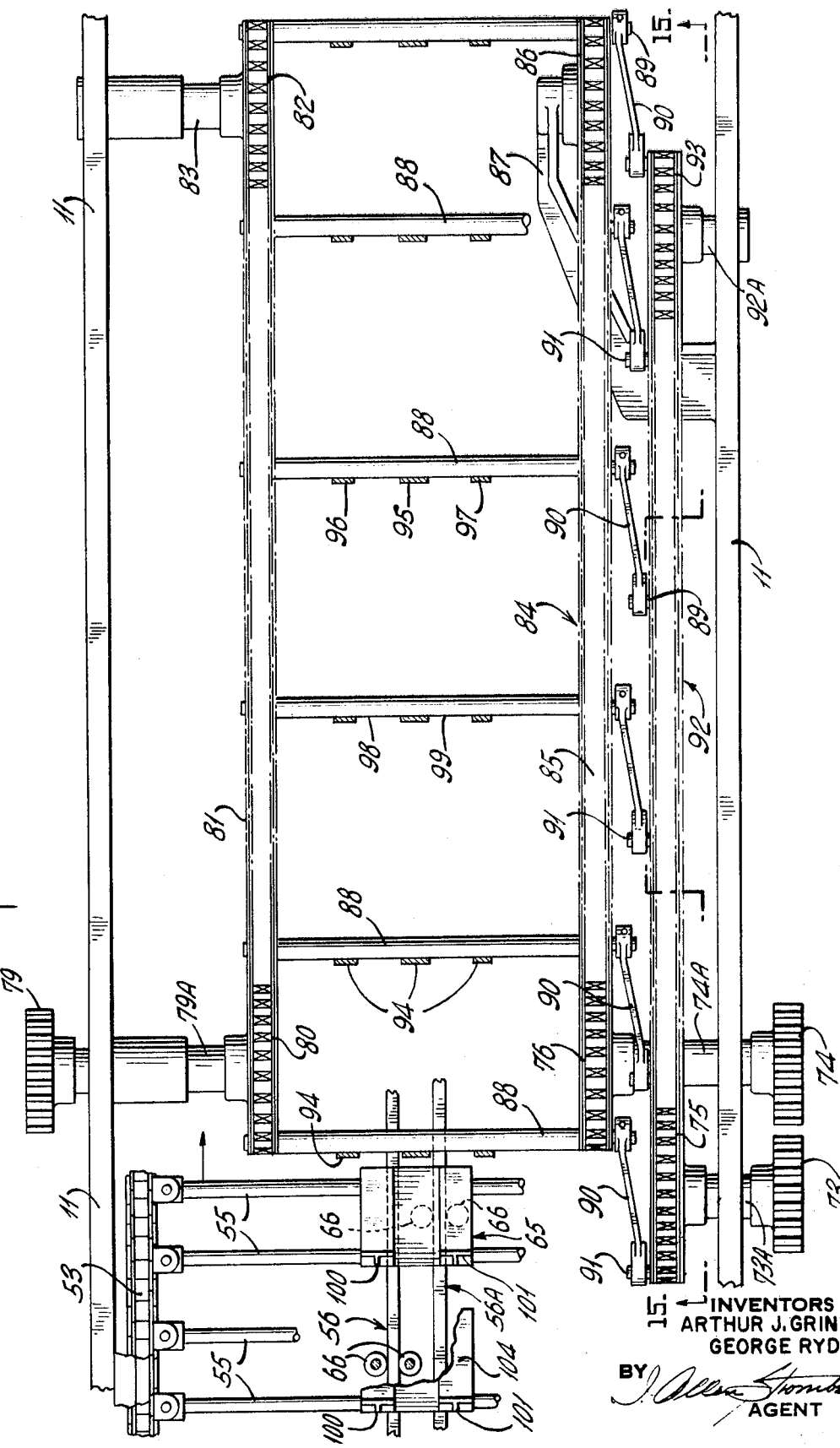

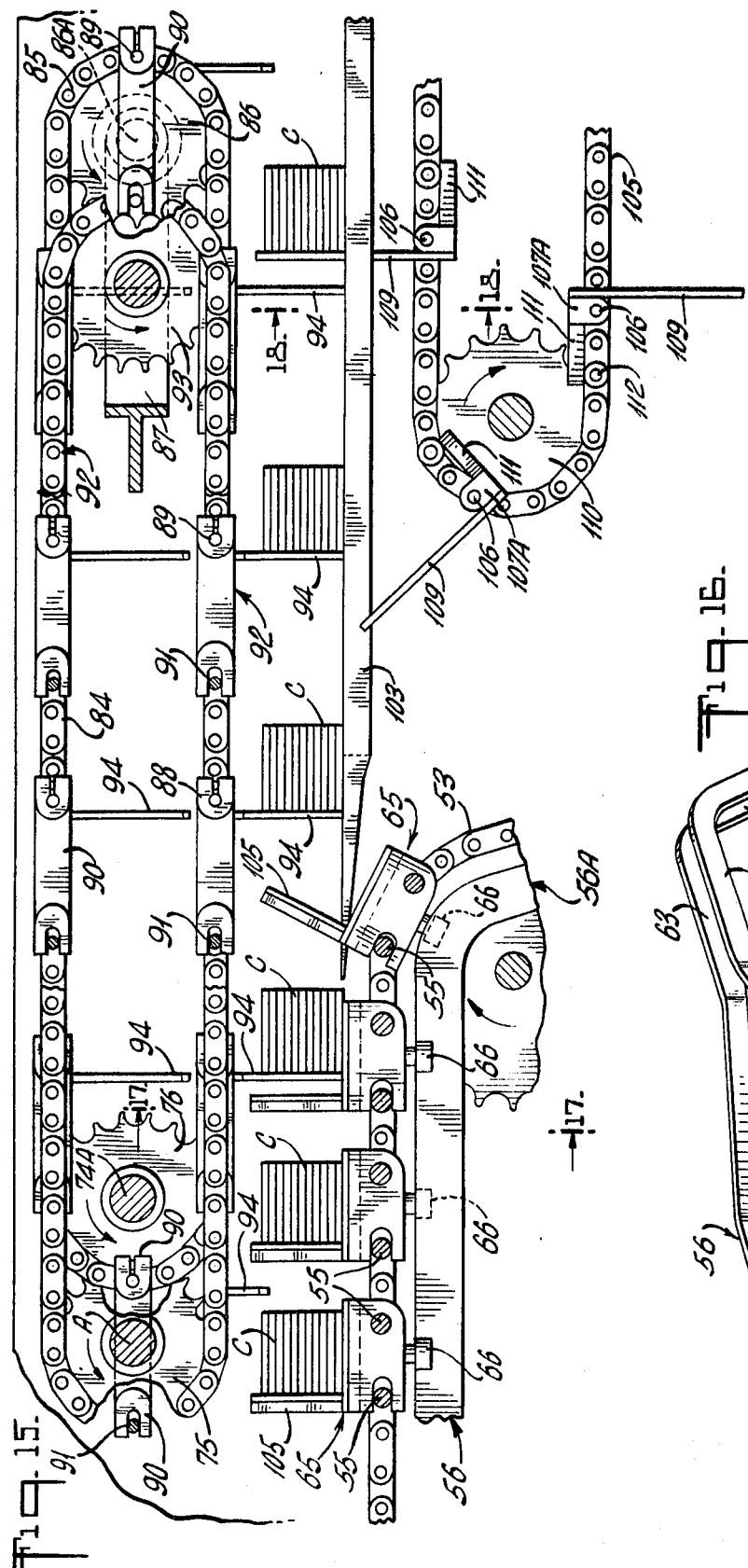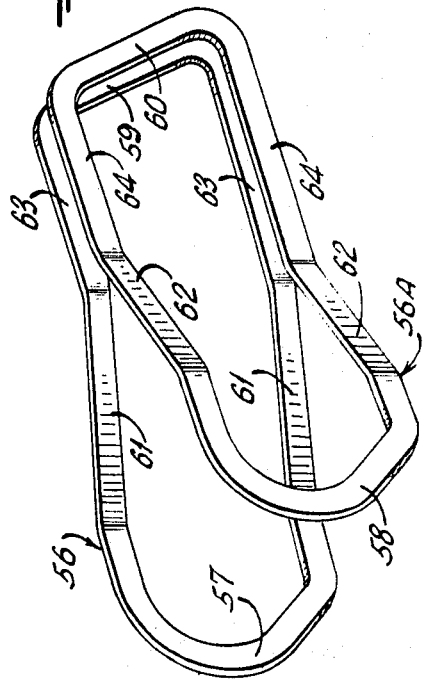

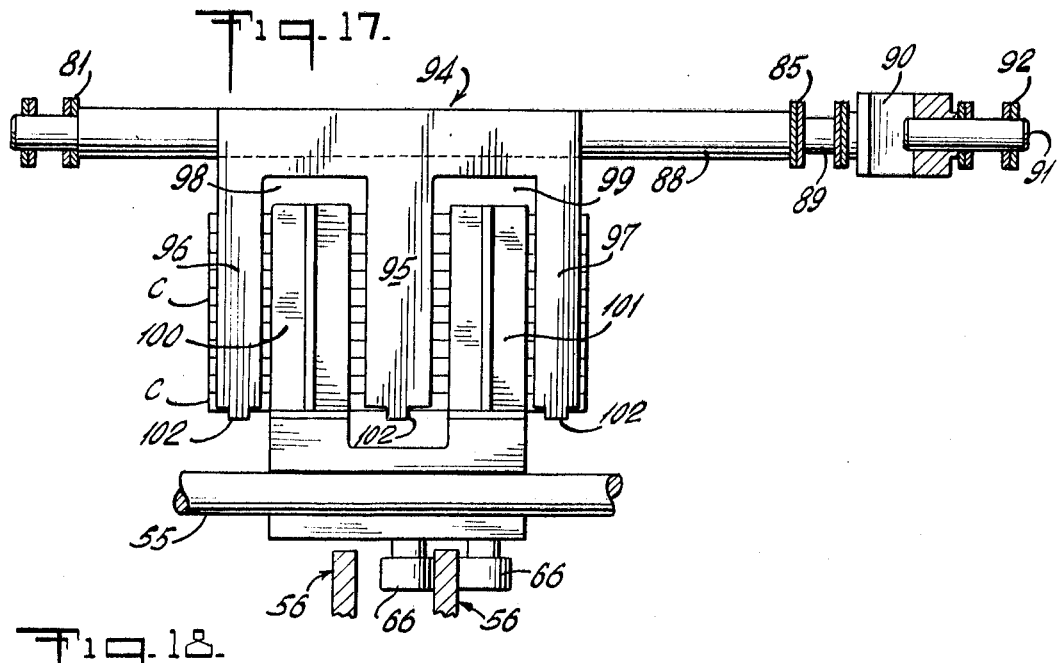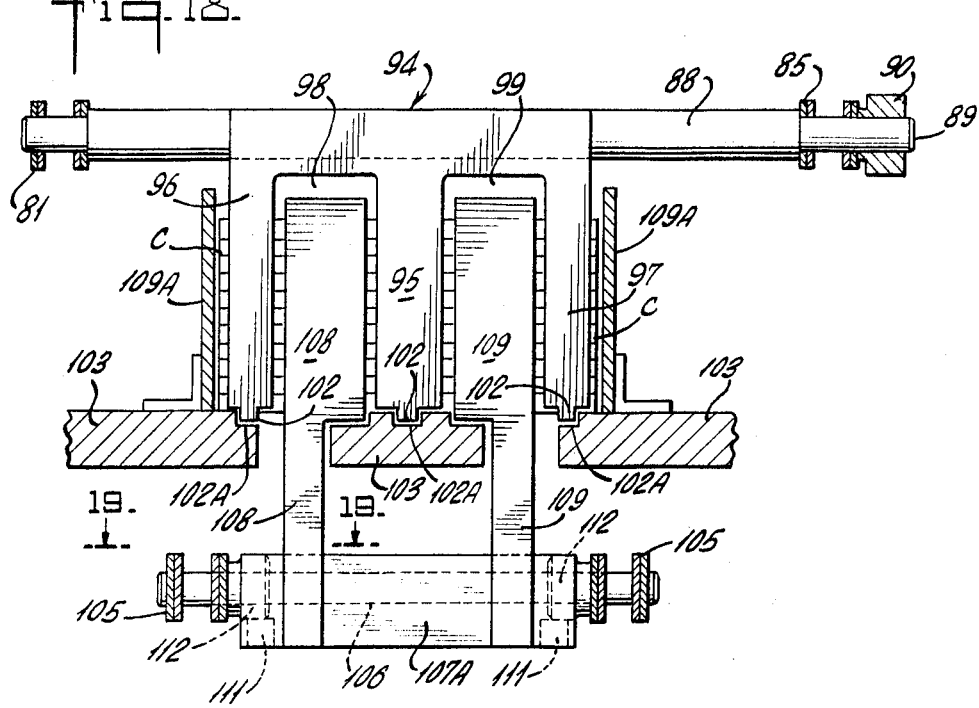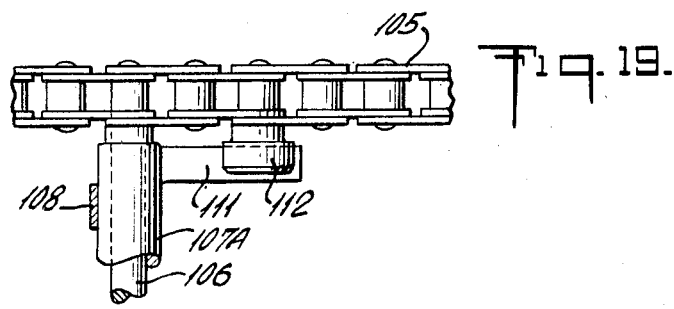

CRACKER STACKING AND SEGREGATING APPARATUS

This invention relates to means for handling fragile crackers which are passed through an apparatus operating at high speed with a minimum of product breakage, wherein rows of single crackers may be passed over metering or transfer wheels to be automatically stacked for packaging.

An important object of the invention is to provide bucket-loading elevator arms having a coordinated action to obtain a continuous flow of crackers in stacked form which can be rapidly delivered to a wrapping machine.

Other objects include the provision of means for receiving crackers fed in from a spacing mechanism; for advancing single crackers to and over transfer wheels; for removing the crackers from the wheels in stacked formation; for depositing the crackers in stacked formation in a moving carrier means which is adapted to interpose the carrier means to bring the stacks into a single column formation for close travel; and to provide a plurality of coordinated conveyor means to move the stacks rapidly out of the stacking machine to a packaging apparatus.

PRIOR ART

An investigation of the art reveals as the nearest reference to applicants' invention, (U.S. Pat. No. 2,324,930 granted to Curt G. Joa, July 20, 1943 for Stacking and Boxing Apparatus) which uses a conveyor to which single articles are fed and from which the articles are removed by pusher arms in groups to be passed to a boxing means. This patent does not disclose the concept of the double feed-in of single crackers, the metering thereof for stacking and the use of a conveyor in which buckets are interposed in travel to provide an outfeed of a larger number of articles in less time than ordinarily required to feed the articles to the machine. U.S. Pat. No. 3,086,334 granted to Arthur J. Griner and Robert J. Albrecht, Apr. 23, 1963 for Metering Apparatus, does not show the infeed of single lines of crackers to be engaged by metering wheels and stacker mechanisms for transfer in predetermined number to conveying means which are interposed to accommodate a maximum number of stacks, the latter being first removed from the buckets by conveyors of one speed and then being propelled by conveyors of greater speed to a packaging machine.

With the foregoing and other objects in view, the invention comprises certain constructions hereinafter described and then particularly pointed out in the claims and a preferred embodiment of the invention is illustrated in the accompanying drawings, in which;

FIG. 1 is a view of the machine in elevation showing the drive gear arrangement and in outline a part of the cracker conveying system;

FIG. 2 is a view of the machine in elevation showing a further arrangement of the conveyors and drive means therefor;

FIG. 3 is a longitudinal section in elevation showing the relationship of the infeed means, the stacking mechanism and the outfeed means;

FIG. 4 is a section in plan taken substantially on the line 4—4 of FIG. 3 showing the shape of the conveyor tracks and associated cracker stacking means;

FIG. 5 is an enlarged section in plan taken on the line 5—5 of FIG. 3 showing the arrangement and relation of the stacking cams and the parts associated therewith FIG. 6 is a vertical section taken on the line 6—6 of FIG. 5 showing the relation of stacker and take away linkages operating in combination with a stacking cam wheel, said figure illustrating step one and zero position of the parts;

FIG. 6A is a side view of the take-away linkage shown separately from the stacker linkage;

FIG. 7 is a view similar to FIG. 6 showing an advanced position of the stacker and take-away parts constituting step 2 of the number one position;

FIG. 7A is a side view of the take-away linkage in an action position without the stacker linkage;

FIG. 8 is a view similar to FIG. 6 showing step three and number four position with the stacker and take-away mechanisms in their respective operating positions;

FIG. 8A is a side view of the take-away linkage as it would appear in FIG. 8 without the stacker linkage;

FIG. 9 is a section on line 9—9 of FIG. 5, similar to FIG. 8, but showing an advanced position referred to as number six with the bucket receiving a measured stack of crackers from the take-away linkage as the stacker begins a retractive movement;

FIG. 9A shows the take-away linkage of FIG. 9 without the stacker mechanism;

FIG. 10 shows seven crackers in position against the edge guides and the bucket advancing to move a metered stack of crackers along the guard plate;

FIG. 11 is a view similar to FIG. 10 but showing an accumulation of eleven crackers awaiting the action of the stacker while a complete stack is being removed by the bucket;

FIG. 12 is an enlarged plan view taken substantially on the line 12—12 of FIG. 11, showing an accumulation of ten crackers ready to be elevated by the stacker as the bucket removes the completed stack of eleven crackers;

FIG. 13 is an enlarged vertical section taken on the line 13—13 of FIG. 3 showing the separation of the right and left hand stacks of crackers preparatory to the interspacing thereof by the configuration of the guide tracks;

FIG. 14 is a plan view taken on line 14—14 of FIG. 3 showing the relative positions of the bucket guiding tracks and a stack propelling conveyor;

FIG. 15 is a vertical section taken on the line 15—15 of FIG. 14 showing the travel of the completed stacks of crackers and discharge thereof;

FIG. 16 is a view in perspective of the tracks used in guiding the stacks and converging the same;

FIG. 17 is a vertical section taken on the line 17—17 of FIG. 15 showing a bucket from which a stack of crackers is being advanced;

FIG. 18 is a vertical section on the line 18—18 of FIG. 15 showing stack advancing fingers coacting with depending stack moving fingers; and FIG. 19 is a section taken on the line 19—19 of FIG. 18 showing the moving means for the stack advancing fingers.

Referring to the drawings in detail, 10 indicates the base of the machine on which is mounted the side walls 11 which support between them the various cross bars, shafts and plates necessary for the mounting of the moving parts of the machine, including the drive motor 12, the driving power of which is transmitted through a belt 13 and pulleys 14 and 15 (FIGS. 1, 2, 3 and 4) to a packaging machine drive shaft 16, one end of which is coupled to a worm shaft 17 as shown at 18. The shaft 17 carries two worms 19 and 20, the latter for driving of a worm gear 21 secured to one end of a shaft 22. Adjacent the worm gear 21, the shaft 22 carries a sprocket wheel 23 about which passes a sprocket chain 24. The latter passes over idler sprockets 25, 26 and 27 and about sprocket gears 28 and 29.

The shaft 22 carries spaced cracker transfer or metering wheels or disks 30 arranged in laterally spaced relation in two separated sets between cracker side-guides 31. The gear 29 is mounted on a shaft 32 on which laterally spaced sprocket gears 33 are secured for drive of conveyor chains 34 each of which corresponds to the conveyor chains 44 in FIG. 1 of U.S. Pat. No. 3,266,614 granted to Arthur J. Griner on Aug. 16, 1966 for Article Spacing System. The chains 34 along with other spacing mechanism 35 of the above patent are shown schematically in FIGS. 1, 2 and 3, there being two spacing machines used, as described in the patent above referred to, and wherein tape belts 36 and 37 are shown only in FIGS. 3 and 4 and correspond to the belts 12 and 150 of the patent. In the present machine the crackers C are fed inwardly on parallel sets of belts, each set including the outer tape belts 36 and the middle tape belt 37 for adequate support of the crackers C as they are fed to two sets of four, cracker metering wheels 30

(FIG. 4), to be seated on the dwell portions 38 thereof, which are bounded by cam rise areas 39, as will be later explained. Edge guides 31A are provided, against which the stacking operation is accomplished as seen in FIGS. 3, 6 and 7.

The worm 19 (FIGS. 2, 4 and 5) operates a worm wheel 40, fixed at one end of a cam shaft 41, on which is mounted four spaced sets of timing cams arranged in pairs, in which each pair includes a lift cam 42 and a pull cam 43, like cams being designated with an alphabetical suffix. At the opposite side of the machine FIG. 1, the cam shaft 41 carries spur gear 46 which meshes with an upper spur gear 47 for driving a gear 48, which, in turn drives gear 49 on shaft 50. The latter carries spaced sprocket wheels 51 and 52 about which pass the bucket conveyor chains 53 and 54. The gears 47 and 48 are mounted on suitable stud shafts 47A and 48A respectively, in the side wall 11. The conveyor chains 53 and 54 each pass over suitable sprockets 53A, 53B, 54A and 54B (FIG. 4). The links of the chains 53 and 54 carry slide bars 55 extending across cam tracks 56 and 56A (FIGS. 13 and 16) which are supported on cross bars 56B and are shaped to provide at one end spaced rounded portions 57 and 58 connected to closely spaced return end sections 59 and 60 by intermediate converging sections 61 and 62 and adjacent parallel sections 63 and 64.

The chain conveyors 53 and 54, for buckets 65, in passing over their sprockets, follow the contour of the cam tracks 56 so that rollers 66 on the bottoms of the buckets 65, in engagement with the cam tracks 56 and 56A, will move the buckets laterally so that they can be interposed with alternate buckets being fed in by the conveyor chains 53 and 54. The travel of the buckets is clearly shown in FIGS. 3, 4, 14 and 15 and in their travel over the sections 57 and 58 they are each loaded with a stack of crackers C which are supported at the ends during passage between the opposed cracker side guides 31, including an arcuate guard plate 67 secured to each guide 31 which is carried on suitable rods 68 extending between the side walls 11. In similar manner the tracks 56 and 56A are supported on cross bars 69 extending between the side walls, FIG. 3.

The shaft 50, FIGS. 1, 2, 4, 14 and 15 also carries a gear 70 which drives gears 71 and 72 on stud shafts 71A and 72A. The gear 70 drives two pinions 73 and 74 which are spaced on the periphery of gear 72 to provide drives through their respective shafts 73A and 74A for sprocket wheels 75 and 76. The gear 49, FIG. 2, drives two meshing gears 77 and 78 for operation of a pinion 79, all three being carried by stud shafts 77A, 78A and 79A respectively. Gear 79 is shown only in FIG. 14 and the stud shaft 79A mounts a sprocket wheel 80 about which passes the sprocket chain 81 to pass about a sprocket wheel 82 mounted on stud shaft 83. This illustrates one side of a pusher conveyor 84, FIG. 15, in which sprocket chain 85 passes over the sprocket wheel 76 and over sprocket wheel 86 which is journalled on a stud shaft 86A in a bearing arm 87 mounted on wall 11. The chains 81 and 85 carry between them cross rods 88, the ends of which, at one end, are pivoted as at 89 to connecting rods 90 which, in turn, are pivoted as at 91 to the links of a sprocket chain 92 passing about sprocket wheels 75 and 93 mounted on stud shafts 73A and 92A respectively. Each cross rod 88 has depending therefrom a cracker stack pushing blade 94 shaped to provide a central section 95 and flanking outer sections 96 and 97 to leave two spaces 98 and 99 through which may pass the vertically disposed spaced panels on strips 100 and 101 of a bucket, 65 in FIG. 17, in which a stack of crackers C are held. It will be noted that the bottom edges of blades 94 are each provided with a key tab 102 which extends below the bottom of the lowest cracker in the bucket and into suitable key ways 102A in spaced discharge plates 103 so that each complete stack is propelled in its entirety. Each bucket 65, FIGS. 17 and 19, has a base 104 from which depends a set of rollers 66 for engagement with the opposite sides of one of the tracks 56, 56A which causes the buckets to have a sidewise sliding movement as they are advanced by the conveyor 53. The buckets 65 have upstanding back members or panels 100 and 101 spaced to allow the cracker pusher blades 94 to pass therethrough, it being noted that the speed of travel of the blades 94 is such that they exceed the speed of travel of the buckets 65 and, as seen in FIG. 3, overtake and pass the buckets to move each stack of crackers C out of its bucket and onto the discharge plates or strips 103 to permit the buckets to return. While the stacks C are being propelled along the plates or strips 103 by the depending blades 94, the stacks are overtaken by a discharge conveyor 105 whose propelling blades 108 and 109 pass through the spaces 98 and 99 between the depending portions of the pusher blades 94, FIGS. 15, 17, 18 and 19. Suitable cross rods 106 on the conveyor 105 each support a pivotal sleeve 107A to which are secured the cracker stack propelling blades 108 and 109 having upper widened portions for engaging the stacks to propel them off the discharge plates 103, between side guides 109A, to a packaging machine, not shown. The blades 108 and 109A, to a packaging machine, not shown. The blades 108 and 109 are moved to vertical position during travel about the feed sprocket wheel 110 of conveyor 105 by contact of a foot portion 111 on sleeve 107A with a roller 112 on the chain of conveyor 105. The latter is driven from the packaging machine and is shown in FIG. 2 passing over a sprocket wheel 113.

The metering wheels 30, FIGS. 3, 4, 5 and 7 to 12, and their associated parts are shown in spaced pairs to handle crackers fed in by the infeed tape belts 36 and 37. As the crackers C are positioned by the metering wheels 30, they are stacked eleven crackers to the stack, for example, by the combined action of stacker mechanisms 114 and take-away mechanisms 115. The stacker mechanism and the take-away mechanism coact to position a stack of crackers in the path of the buckets 65 of the bucket conveyor 53. Shown in FIG. 5 are two sets of four metering wheels 30, and two sets of stacker and take-away mechanisms, and a description of these parts at one side of the machine will suffice. Each stacker 114 includes arm 116 suspended at the lower ends of a pair of links, one designated as a stacker pull link 117 and the other as a stacker lift link 118, the latter being pivoted on a fixed cross shaft 120 about which the links rock, while the stacker pull link 117 is pivoted on the shaft 120, through an arm 119. In step 1 of the operation as shown in FIG. 6, the cam shoulder 39 on cam 30 as it rides under the stack of accumulated crackers lifts the latter to let, in this instance, cracker number 11 be seated beneath the stack as the bottom cracker therein. The arm 119 has a depending cam arm 121 whose roller 122 is engaged and actuated by the cam 43C, FIG. 5, to retract link 117 at the same time that a depending cam arm 123 engages and is operated by the stacker lift cam 42C. As this action is occurring, a take-away arm 124, FIG. 6A, of the take-away mechanism 115 is being retracted as in FIG. 7 and advanced through the action of a take-away pull arm 125 and a take-away left arm 126. The arm 125 through a link 127 is connected to shaft 120 while the arm 126 along with two depending cam arms 128 and 129 are likewise connected. The arm 128 is a pull arm while the arm 129 is a lift arm, the arm 128 being actuated by the cam 43b in a retractive movement and the arm 129 being operated by the lift cam 42b. The free ends of each of the stacker and take-away arms are forked to allow for any interfitting relation as might occur such as at the tips of the arms in FIG. 8.

In FIG. 8, four crackers are positioned in a new stack as at 130A but, as shown in FIG. 7, the stacker 114 supports a complete stack. In FIG. 8 the take-away mechanism 115 has lowered the arm 124 and advanced it to a position under the stack as in FIG. 9, the respective positions of the parts being shown in FIGS. 8$^a$ and 9$^a$. The arm 116 of the stacker mechanism 114 has a retractive and lowering movement as in FIGS. 9 and 10, the take-away arm 124 sustaining the completed stack in position to be engaged by the bucket 65. FIG. 11 shows the stacker arm 116 in the process of resuming its position beneath a stack of ten crackers, so that when the eleventh cracker is deposited in the stack, the operation will continue as from the FIG. 6 position. Side edge guides 31A are provided along which the crackers are aligned. At the opposite side of the machine as in FIG. 5 the operation is the same as described but the timing of the stacking is varied, that is, there will be four crackers in the lower stack as shown in FIG. 8 to compensate for travel of the buckets which will be in alternate positions on the tracks as seen in FIG. 4. Each of the depending cam arms 123 which actuates the stacker mechanism 114 and the take-away mechanism 115, in addition to carrying the rollers 122, (FIG. 3) also has pivoted thereto a pressure rod 130, the coil spring 131 of which abuts a cross beam 132 and yieldably maintains each roller 122 in contact with its cam. The rod 130 and beam 132 is shown only in FIG. 3, where two juxtaposed cams 43$^c$ and 42$^c$ are fragmentarily illustrated. The pull and lift cams are shaped to provide for the precise timing operations of the stacker and take-away mechanisms 114 and 115 respectively, the operations of which must be closely coordinated to continuously accumulate and discharge successive stacks of crackers of predetermined number.

The invention is not to be restricted to the precise details of construction shown since various changes and modifications may be made therein without departing from the scope of the invention or sacrificing the advantages to be derived from its use.

What we claim is:

1. In a cracker stacking machine for receiving rows of crackers or the like arriving on an infeed conveyor belt, the combination of:
   a. Cracker transfer means including rotatable disks at the end of said infeed conveyor belt presenting dwell portions for receiving crackers one at a time from said infeed conveyor;
   b. Conveyor means aligned with and extending from said transfer means in a direction generally parallel to and in alignment with said infeed conveyor and having a flight portion moving away from said infeed conveyor, said conveyor means carrying buckets spaced along the length thereof;
   c. Coacting stacker means between said transfer means and said conveyor means operable to remove the crackers from the transfer means to consecutively form and position a stack of a predetermined number of crackers in the path of each bucket; and
   d. Second conveyor means aligned with and overlapping said flight portion of said first conveyor means and having members for engaging and removing the stacks from said buckets and advancing them to a discharge position.

2. In a cracker stacking machine for receiving rows of crackers or the like arriving on an infeed conveyor belt, the combination of:
   a. Cracker transfer means including rotatable disks at the end of said infeed conveyor and presenting dwell portions for receiving crackers one at a time from said infeed conveyor;
   b. Conveyor means above said transfer means aligned with and extending from said transfer means in a direction generally parallel to and in alignment with said infeed conveyor, said conveyor means carrying buckets spaced along the length thereof;
   c. Stacking means between said transfer means and said conveyor means including stacking and take-away arms extending between the discs of said cracker transfer means;
   d. Linkage means for operating both of said arm means; and
   e. Cam means for actuating said linkage means to raise and lower said arm means for successively lifting stacks of crackers into the path of said conveyor buckets when a predetermined number of crackers has been assembled in each stack.

3. A cracker stacking machine as set forth in claim 1, in which:
   a. Said coacting stacker means includes edge guide means along which the crackers are stacked for removal from said transfer means, and
   b. Shoulder means in said dwell portions for lifting a cracker on the dwell portion into abutting contact with said edge guide means.

4. In a cracker stacking machine for receiving rows of crackers or the like arriving on an infeed conveyor belt, the combination of:
   a. Cracker transfer means including rotatable disks presenting dwell portions for receiving crackers one at a time from said infeed conveyor;
   b. Conveyor means including buckets;
   c. Coacting stacker means operable to remove the crackers from the transfer means to form a stack for each bucket; and
   d. Conveyor means for removing the stacks from said buckets and advancing them to a discharge position
   e. Said stacking means includes a stacker arm, pull and lift linkages operable for advancing, retracting, raising and lowering of said stacker arm whereby the stacker arm will provide an initial lift for a stacked group of crackers;
   f. A take-away arm element, pull and lift linkages operable for advancing, raising and lowering movements of said take-away arm, whereby the take-away arm will displace the stacker arm to provide a complete elevating cycle to the stack; and
   g. Timing cam means for coordinating the operations of said stacker and take-away arm linkages to successively position stacks of crackers for engagement by said buckets.

5. In a cracker stacking machine as set forth in claim 4, in which:
   a. The operating linkages of said take-away arm, during each stacking cycle cooperate with the linkages of said stacker arm to position the latter for initial movement of said stacks.

6. A cracker stacking machine as set forth in claim 1 in which:
   a. Said first conveyor means has one end thereof positioned near said stacker means and said buckets individually receive a stack of crackers in traversing said end of said first conveyor means;
   b. A side guide along which the buckets move for retaining the stacks therein; and
   c. Cam track means engagable by said buckets to position them for removal of the stacks by said stack removing conveyor means.

7. A cracker stacking machine as set forth in claim 1 in which:
   a. Said buckets have an open forward face and have spaced stack engaging panels at the rear thereof; and
   b. Said stack removing conveyor means includes pusher blades for passage through the buckets between said panels; said stack removing conveyor being driven at a faster rate than said bucket conveyor to remove the stacks from the buckets through the open forward face thereof.

8. In a cracker stacking machine for receiving crackers or the like arranged in column formation on parallel infeed conveyor means, the combination of:
   a. Rotary cracker transfer disk means presenting dwell portions for receiving crackers one at a time from each of said infeed conveyor means;
   b. Conveyor means including buckets having rollers for alternate alignment with said infeed conveyor means, and including slide bars for mounting said buckets for lateral movement;
   c. Coacting stacker means operable to remove the crackers from each transfer means to provide a stack for each of said buckets;
   d. Cam means for integrating the buckets for travel in a single line; and
   e. Conveyor means for removing the cracker stack from each bucket and advancing it to a discharge position.

9. A cracker stacking machine as set forth in claim 8, in which:

a. A shoulder ledge forms the leading end of each dwell portion and is arranged to provide a limit abutment for each cracker fed to said dwell portion, and b. Said shoulder ledge is adapted to lift one or more pre-stacked crackers as a cracker on the adjacent dwell portion is positioned under said pre-stacked crackers.

10. A cracker stacking machine as set forth in claim 8, in which:

a. One of said coacting stacker means is disposed at the infeed end of each of said infeed conveyor means, and is operable to provide a cracker stack for each alternate bucket, and b. Said coacting stacker means includes arms, operating linkages for said arms and timing cam means for controlling said arms to successively lift stacks of crackers into the path of alternate buckets whenever a predetermined number of crackers has been assembled in each stack.

11. A cracker stacking machine as set forth in claim 8, in which:

a. Said cam means includes tracks having spaced ends disposed adjacent the discharge end of each of said infeed conveyor means adapted to be engaged by said bucket rollers for moving the buckets laterally on said slide bars, and b. Said cam means include converging and parallel sections for integrating the buckets for travel thereof in a single line.

12. A cracker stacking machine as set forth in claim 8, in which:

a. Each of said coacting stacker means includes stacker and take-away arms having forked ends extending between the disks of said cracker transfer means;

b. Operating linkage means for both of said arms; and c. Cam means for actuating the linkage means for raising and lowering the stacker and take-away arms to lift stacks of crackers into the paths of said conveyor buckets when a predetermined number of crackers has been assembled in each stack.

13. A cracker stacking machine as set forth in claim 8, in which:

a. Said stack removing conveyor means includes a pusher conveyor having pusher blades for passage through openings in the buckets to remove the stacks from said buckets, and b. Discharge conveyor means for moving the stacks away from the pusher blades at increased rate of travel to a discharge position.

* * * * *